(12) United States Patent
Yip et al.

(10) Patent No.: US 10,936,415 B2
(45) Date of Patent: Mar. 2, 2021

(54) ERROR CORRECTION SCHEME IN FLASH MEMORY

(71) Applicant: Western Digital Technologies, Inc., San Jose, CA (US)

(72) Inventors: Chris Yip, San Jose, CA (US); Piyush Sagdeo, San Jose, CA (US); Gautam Dusija, San Jose, CA (US); Vidhu Gupta, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 28 days.

(21) Appl. No.: 16/455,857

(22) Filed: Jun. 28, 2019

(65) Prior Publication Data

US 2020/0409787 A1 Dec. 31, 2020

(51) Int. Cl.
*G06F 11/10* (2006.01)
*G06F 11/16* (2006.01)
*G06F 12/02* (2006.01)
*G06F 13/16* (2006.01)

(52) U.S. Cl.
CPC ...... *G06F 11/1068* (2013.01); *G06F 11/1048* (2013.01); *G06F 11/1096* (2013.01); *G06F 11/1666* (2013.01); *G06F 12/0246* (2013.01); *G06F 13/1668* (2013.01); *G06F 2212/1036* (2013.01); *G06F 2212/403* (2013.01); *G06F 2212/7205* (2013.01)

(58) Field of Classification Search
CPC .. G11C 29/76; G06F 11/1008; G06F 11/1068; G06F 11/1096
See application file for complete search history.

(56) References Cited

U.S. PATENT DOCUMENTS

| | | | | |
|---|---|---|---|---|
| 8,161,334 B1* | 4/2012 | Hulbert | ................ | G11C 29/76 714/723 |
| 9,015,561 B1* | 4/2015 | Hu | ................ | G11C 16/0483 714/773 |
| 2011/0302445 A1* | 12/2011 | Byom | ................ | G11C 29/883 714/6.1 |
| 2013/0086353 A1* | 4/2013 | Colgrove | ............ | G06F 12/1009 711/206 |
| 2016/0266965 A1* | 9/2016 | B | ................ | G06F 11/108 |
| 2018/0074891 A1* | 3/2018 | Yang | ................ | H03M 13/13 |
| 2020/0004627 A1* | 1/2020 | Sharon | ................ | G06F 3/0689 |

\* cited by examiner

*Primary Examiner* — Steve N Nguyen
(74) *Attorney, Agent, or Firm* — Dickinson Wright PLLC; Steven Hurles

(57) ABSTRACT

An error correction scheme in flash memory. Methods include extending a lifetime of a memory block, including: receiving an indication that an error occurred during a write operation at a first location in a memory block, the first location associated with a faulty page of the memory block; and performing a modified exclusive OR (XOR) scheme on the memory block by: performing a de-XOR operation that generates recovery data of the faulty page; storing the recovery data in a location different from the faulty page of memory; marking the faulty page for exclusion in future de-XOR operations; and performing a parity calculation that generates an updated parity value that includes all pages of the memory block that have been programmed except for the faulty page.

12 Claims, 12 Drawing Sheets

STEP 1: PROGRAM DATA IN A FAULTY PAGE OF MEMORY, AT TIME M ENCOUNTER A FAILURE INDICATING PAGE IS FAULTY

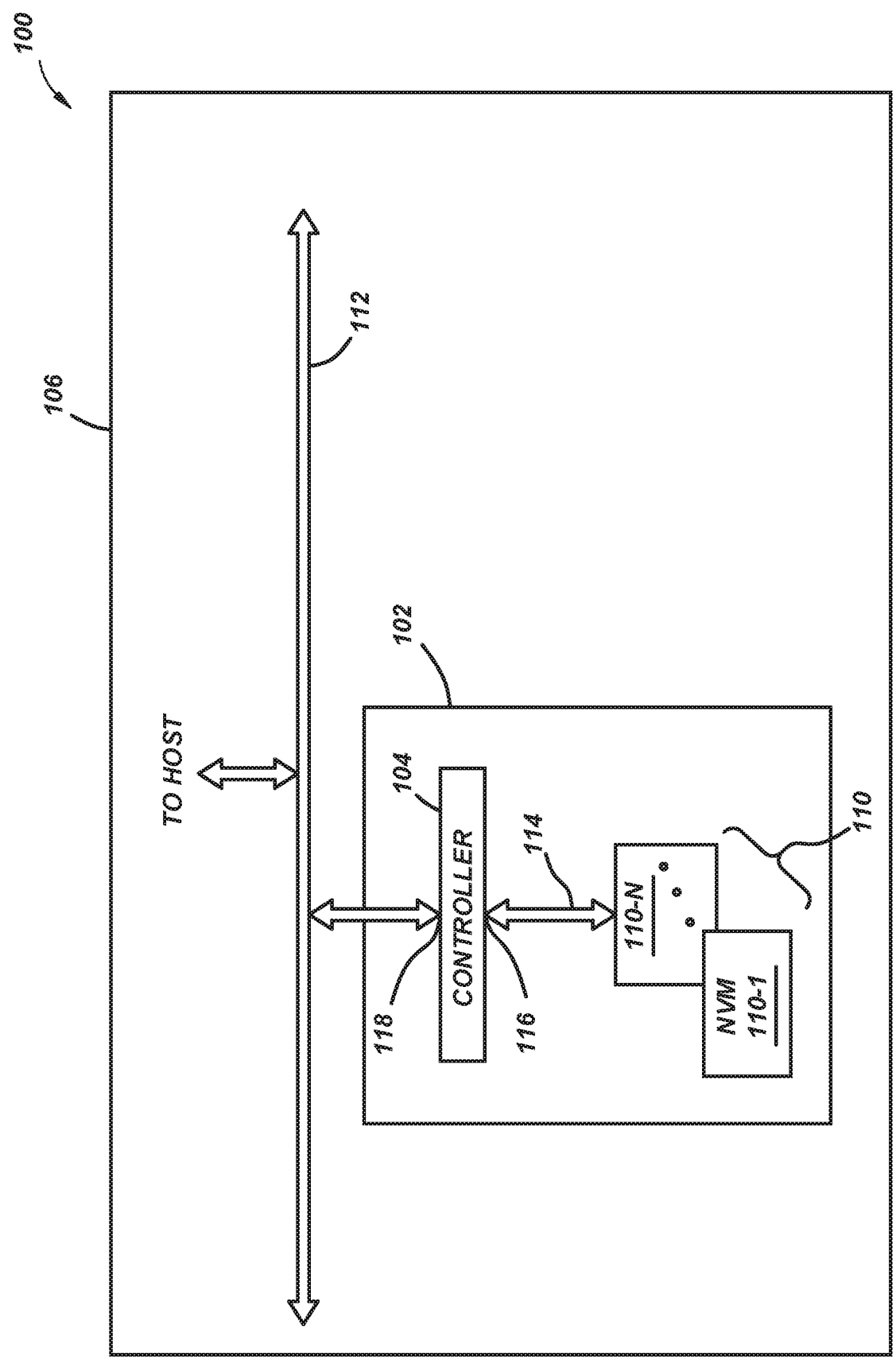

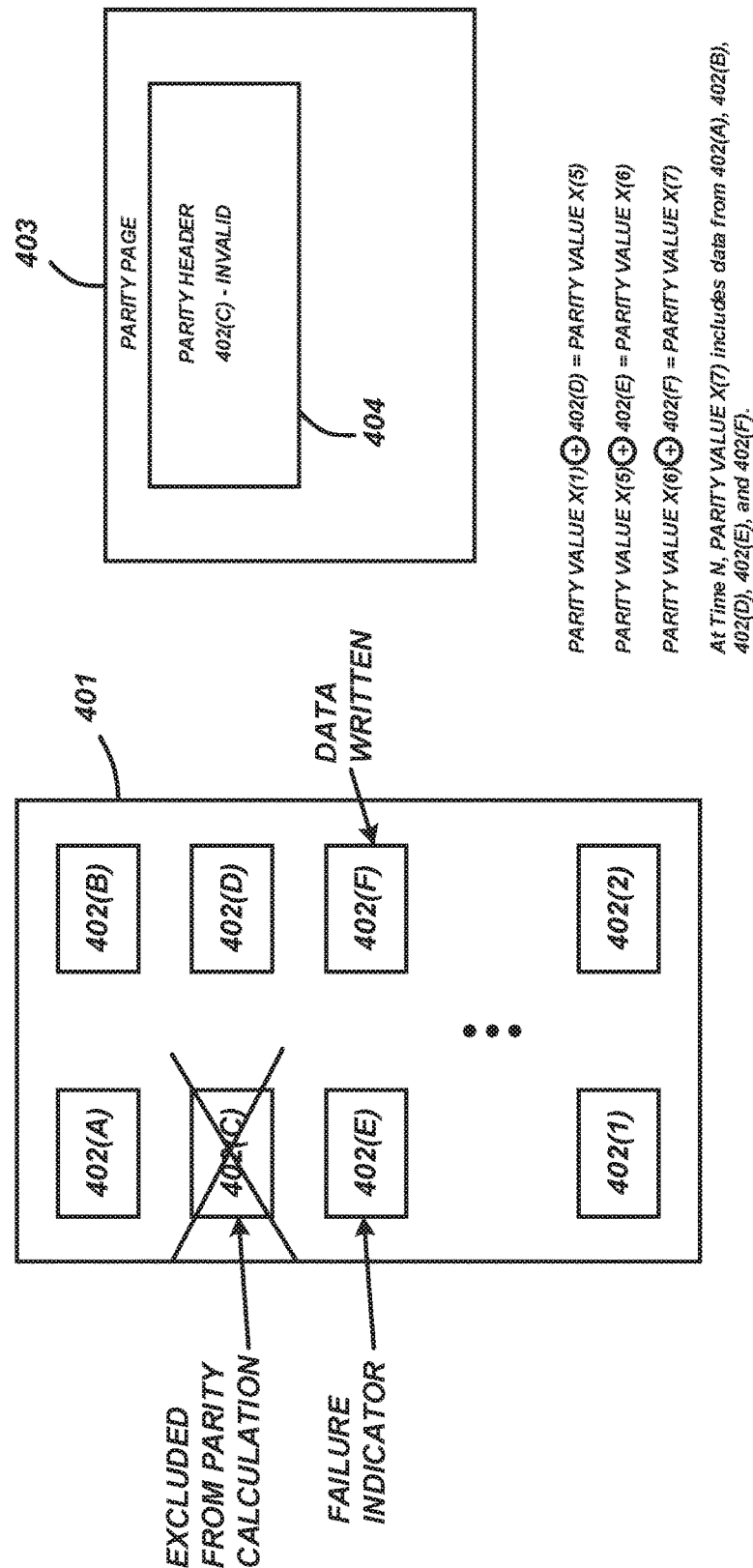

ERROR CORRECTION SCHEME IN FLASH MEMORY

BACKGROUND

Non-volatile memory systems retain stored information without requiring an external power source. One type of non-volatile memory that is used ubiquitously throughout various computing devices and in stand-alone memory devices is flash memory. For example, flash memory can be found in a laptop, a digital audio player, a digital camera, a smart phone, a video game, a scientific instrument, an industrial robot, medical electronics, a solid state drive, and a USB drive.

Flash memory can experience various failure modes caused by various issues rooted either in the hardware or software configuration of the flash memory. Some failures can be corrected with error correction code, such as exclusive OR (XOR) parity, however error correction code has limitations to the types and number of errors that can be corrected. Often if a memory controller is unable to correct an error using error correction code, the controller marks a memory block for garbage collection. The garbage collection operation copies valid data within the memory block to a new location in memory and then erases the entire memory block. The memory block may then either be retired or made available for future data writes.

SUMMARY

Various embodiments include a method of extending a lifetime of a memory block, including: receiving an indication that an error occurred during a write operation at a first location in a memory block, the first location associated with a faulty page of the memory block; and performing a modified exclusive OR (XOR) scheme on the memory block by: performing a de-XOR operation that generates recovery data of the faulty page; storing the recovery data in a location different from the faulty page of memory; marking the faulty page for exclusion in future de-XOR operations; and performing a parity calculation that generates an updated parity value that includes all pages of the memory block that have been programmed except for the faulty page.

Other embodiments include a memory controller, including: a first terminal configured to couple to a memory array, the memory controller configured to: receive an indication that an error occurred during a write operation at a first location in a memory block, the first location associated with a faulty page of the memory block; and perform a modified exclusive OR (XOR) scheme at a first time on the memory block, where the memory controller is further configured to: perform a de-XOR operation starting with a page of the memory block that is valid, where the de-XOR operation generates recovery data of the faulty page ; store the recovery data in a location different from the faulty page; mark the faulty page for exclusion in future de-XOR operations; and perform a parity calculation that generates an updated parity value that includes all pages of the memory block that have been programmed except for the faulty page.

Additional embodiments include a non-volatile storage system, configured to extend a lifetime of a memory block, including: a memory array including a memory block; a controller coupled to the memory array, where the controller is configured to: program a first data into a first location in a memory block, in response to encountering a failure indicator associated with a preceding location, the preceding location precedes the first location; determine whether the preceding location is at the end of the memory block, in response to determining the preceding location is a location other than the end of the memory block; read first data from latches, and store the first data in a random access memory location; then perform a modified exclusive OR (XOR) scheme in the preceding location in the memory block, where the controller is further configured to: perform a de-XOR operation that generates recovery data of the preceding location, store the recovery data in a different location, and mark the preceding location for exclusion from a subsequent de-XOR operation performed on the memory block.

BRIEF DESCRIPTION OF THE DRAWINGS

For a detailed description of example embodiments, reference will now be made to the accompanying drawings in which:

FIG. 1 illustrates a block diagram of an example non-volatile memory system, in accordance with some embodiments.

FIG. 6A illustrates a conceptual and method diagram in which a modified XOR scheme is performed on a memory block, in accordance with some embodiments.

DETAILED DESCRIPTION

Figure 2A:
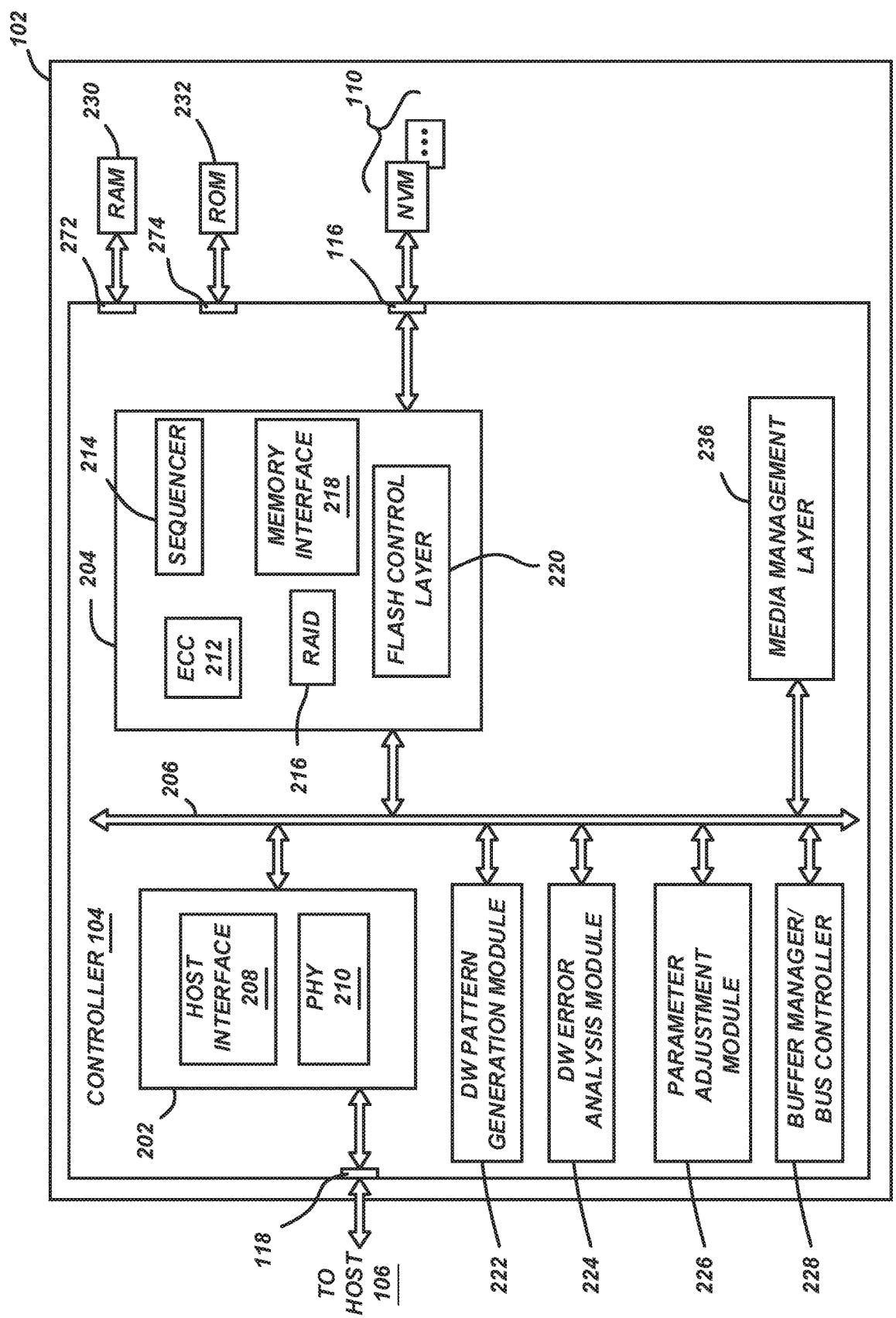
FIG. 2A illustrates a block diagram of example components of a controller, in accordance with some embodiments.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. References to a controller shall mean individual circuit components, an application-specific integrated circuit (ASIC), a microcontroller with controlling software, a digital signal processor (DSP), a processor with controlling software, a field programmable gate array (FPGA), or combinations thereof.

At least some of the example embodiments are directed to extending a lifetime of a memory block, including: receiving an indication that an error occurred during a write operation at a first location in a memory block, the first location associated with a faulty page of the memory block; and performing a modified exclusive or (XOR) scheme on the memory block by: performing a de-XOR operation that generates recovery data of the faulty page; storing the recovery data in a location different from the faulty page of memory; marking the faulty page for exclusion in future de-XOR operations; and performing a parity calculation that generates an updated parity value that includes all pages of the memory block that have been programmed except for the faulty page.

The modified XOR scheme enables a controller to recover data from memory pages that are not necessarily adjacent to each other. For example, assuming a planar memory structure where a page correlates to a word line, if a short exists across three word lines, a memory controller can recover data from the first and third word lines using the modified XOR scheme, where the second word line is disposed between the first and third word lines. That is, the modified XOR scheme enables the memory controller to recover data from word lines that are also not adjacent to each other. The ability to recover data from non-adjacent word lines, in a failing word block can extend the lifetime of memory. For example, in a situations where a short extends across more than two word lines, without access to the modified XOR scheme, a controller would conventionally mark the memory block for garbage collection whereby valid data within the memory block is copied to a new location in the memory and then the entire memory block is erased. However, through the use of the modified XOR scheme, a controller can continue to use the failing block and delay marking the failing block for garbage collection until a later time.

The methods described below additionally include a controller configured to: program a first data into a first location in a memory block; in response to encountering a failure indicator associated with a preceding location, the preceding location precedes the first location; determine whether the preceding location is at the end of the memory block; in response to determining the preceding location is a location other than the end of the memory block; read first data from latches and store the first data in a random access memory location; then perform a modified exclusive OR (XOR) scheme in the preceding location in the memory block where the controller is further configured to: perform a de-XOR operation that generates recovery data of the preceding location, store the recovery data in a different location, and mark the preceding location for exclusion from a subsequent de-XOR operation performed on the memory block.

FIG. 1 illustrates a block diagram of an example system architecture 100 including non-volatile memory 110. In particular, the example system architecture 100 includes storage system 102 that further includes a controller 104 communicatively coupled to a host 106 by a bus 112. The bus 112 implements any known or after developed communication protocol that enables the storage system 102 and the host 106 to communicate. Some non-limiting examples of a communication protocol include Secure Digital (SD) protocol, Memory Stick (MS) protocol, Universal Serial Bus (USB) protocol, or Advanced Microcontroller Bus Architecture (AMBA).

The controller 104 has at least a first port 116 coupled to a non-volatile memory ("NVM") 110, hereinafter "memory 110" by way of a communication interface 114. The memory 110 is disposed within the storage system 102. The controller 114 couples the host 106 by way of a second port 118 and the bus 112. The first and second ports 116 and 118 of the controller can include one or several channels that couple the memory 110 or the host 106, respectively.

The memory 110 of the storage system 102 includes several memory die 110-1-110-N. The manner in which the memory 110 is defined in FIG. 1 is not meant to be limiting. In some embodiments, the memory 110 defines a physical set of memory die, such as the memory die 110-1-110-N. In other embodiments, the memory 110 defines a logical set of memory die, where the memory 110 includes memory die from several physically different sets of memory die. The memory die 110 include non-volatile memory cells that retain data even when there is a disruption in the power supply. Thus, the storage system 102 can be easily transported and the storage system 102 can be used in memory cards and other memory devices that are not always connected to a power supply.

In various embodiments, the memory cells in the memory die 110 are solid-state memory cells (e.g., flash), one-time programmable, few-time programmable, or many time programmable. Additionally, the memory cells in the memory die 110 can include single-level cells (SLC), multiple-level cells (MLC), or triple-level cells (TLC). In some embodiments, the memory cells are fabricated in a planar manner (e.g., 2D NAND (NOT-AND) flash) or in a stacked or layered manner (e.g., 3D NAND flash).

Still referring to FIG. 1, the controller 104 and the memory 110 are communicatively coupled by an interface 114 implemented by several channels (e.g., physical connections) disposed between the controller 104 and the individual memory die 110-1-110-N. The depiction of a single interface 114 is not meant to be limiting as one or more interfaces can be used to communicatively couple the same components. The number of channels over which the interface 114 is established varies based on the capabilities of the controller 104. Additionally, a single channel can be configured to communicatively couple more than one memory die. Thus the first port 116 can couple one or several channels implementing the interface 114. The interface 114 implements any known or after developed communication protocol. In embodiments where the storage system 102 is flash memory, the interface 114 is a flash interface, such as Toggle Mode 200, 400, or 800, or Common Flash Memory Interface (CFI).

In various embodiments, the host 106 includes any device or system that utilizes the storage system 102—e.g., a computing device, a memory card, a flash drive. In some example embodiments, the storage system 102 is embedded within the host 106—e.g., a solid state disk (SSD) drive installed in a laptop computer. In additional embodiments, the system architecture 100 is embedded within the host 106 such that the host 106 and the storage system 102 including the controller 104 are formed on a single integrated circuit chip. In embodiments where the system architecture 100 is implemented within a memory card, the host 106 can include a built-in receptacle or adapters for one or more types of memory cards or flash drives (e.g., a universal serial bus (USB) port, or a memory card slot).

Although, the storage system 102 includes its own memory controller and drivers (e.g., controller 104)—as will be described further below in FIG. 2A—the example described in FIG. 1 is not meant to be limiting. Other embodiments of the storage system 102 include memory-only units that are instead controlled by software executed by a controller on the host 106 (e.g., a processor of a computing device controls—including error handling of—the storage unit 102). Additionally, any method described herein as being performed by the controller 104 can also be performed by the controller of the host 106.

In various embodiments, the controller 104 serves as an interface between the host 106 and the storage system 102 and manages data stored on the storage system 102. The controller 104 can include individual circuit components, processing circuitry (e.g., logic gates and switches), a processor, a microprocessor, a microcontroller with controlling software, or a field programmable gate array (FPGA). The example controller 104 can include a computer-readable medium that stores computer-readable program code (e.g., software or firmware) executable by a processor. In some embodiments, the controller 104 is a flash memory controller. In other embodiments, the functionality of the controller 104 is implemented by a processor executing within the host 106.

Still referring to FIG. 1, the host 106 includes its own controller (e.g., a processor) configured to execute instructions stored in the storage system 102 and further the host 106 accesses data stored in the storage system 102, referred to herein as "host data". The host data includes data originating from and pertaining to applications executing on the host 106. In one example, the host 106 accesses host data stored in the storage system 102 by providing a logical address to the controller 104 which the controller 104 converts to a physical address. The controller 104 accesses the data or particular storage location associated with the physical address and facilitates transferring data between the storage system 102 and the host 106. In embodiments where the storage system 102 includes flash memory, the controller 104 formats the flash memory to ensure the memory is operating properly, maps out bad flash memory cells, and allocates spare cells to be substituted for future failed cells or used to hold firmware to operate the flash memory controller (e.g., the controller 104). Thus, the controller 104 performs various memory management functions such as wear leveling (e.g., distributing writes to extend the lifetime of the memory blocks), garbage collection (e.g., moving valid pages of data to a new block and erasing the previously used block), and error detection and correction (e.g., read error handling, modified XOR operations).

Additional details of the controller 104 and the memory 110 are described next in FIGS. 2A and 2B. Specifically, FIG. 2A shows, in block diagram form, additional details with respect to the controller 104 (introduced in FIG. 1A) of the storage system 102. FIG. 2A illustrates previously described controller 104, memory 110 and ports 116 and 118, and additionally a random access memory (RAM) 230 and a read only memory (ROM) 232. The RAM 230 and ROM 232 are respectively coupled to the controller 104 by a RAM port 272 and a ROM port 274.

Although the RAM 230 and the ROM 232 are shown as separate modules within the storage system 102, the illustrated architecture is not meant to be limiting. For example, the RAM 230 and the ROM 232 can be located within the controller 104. In other cases, portions of the RAM 230 or ROM 232, respectively, can be located outside the controller 104. In other embodiments, the controller 104, the RAM 230, and the ROM 232 are located on separate semiconductor die. In some embodiments, the ROM 232 stores system boot code. The discussion now turns to the various example modules included within the controller 104.

The following discussion of the various modules depicted within the controller 104 are meant to be illustrative and not limiting. For example, the various modules described in FIG. 2A are not limited to being executed within the controller 104; one or more modules can be executed outside the controller 104. As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combinations thereof. In other embodiments, a module can include memory that stores instructions executable by a controller to implement a feature of the module. Thus, the controller can be configured with hardware and/or firmware to perform the various functions described herein.

The modules within the controller (e.g., modules 202 and 204) are communicatively coupled to each other by a bus 206. The module 202 interfaces with the host 106 and includes a host interface 208 and a physical layer interface 210 that provides the electrical interface between the host 106 or next level storage controller and the controller 104. The host interface 208 facilitates transfer of data, control signals, and timing signals. Examples of the host interface 208 include SATA, SATA express, Serial Attached SCSI (SAS), Fibre Channel, USB, PCIe, and NVMe.

Still referring to FIG. 2A, the module 204 is configured to communicate with the memory 110, by way of port 116, and includes an error correcting code (ECC) engine 212, a sequencer 214, a Redundant Array of Independent Drives (RAID) module 216, a flash control layer 220, and a memory interface 218. In some embodiments, the ECC engine 212 encodes host data received from the host 106 and stores the encoded host data in the memory 110. When the host data is read out from the memory 110, the ECC engine 212 decodes the host data and corrects errors detected within the host data. In various embodiments, the sequencer 214 generates command sequences, such as program and erase command sequences that are transmitted to the memory 110.

The RAID module 216 generates RAID parity and recovery of failed data. The RAID parity can be used to provide an additional level of integrity protection for data written into the memory 110. In some embodiments, the ECC engine 212 implements the functions of the RAID module 216. Additionally, the ECC engine 212 implements the modified XOR scheme as described further herein.

The memory interface 218 provides command sequences to the memory 110 and receives status information from the memory 110. For example, the memory interface 218 implements any known or after developed communication protocol including a double data rate (DDR) interface, such as a Toggle Mode 200, 400, or 800. The flash control layer 220 controls the overall operation of the module 204.

Still referring to FIG. 2A, additional modules within the controller 104 include a dummy word line (DW) pattern generation module 222, a DW error analysis module 224, and a parameter adjustment module 226. In various embodiments, the DW pattern generation module 222 puts a known data pattern into a dummy word line and tracks or periodically check for errors by reading the data back out of the dummy word line and comparing the data to the known data pattern. In various embodiments, the parameter adjustment module 226 adjusts parameters associated with a particular non-volatile memory die or more specifically a particular memory block.

The example controller 104 includes a buffer manager/bus controller 228 that manages, for example, buffers in the RAM 230 and controls the internal bus arbitration of the bus 206 in the controller 104. Additionally, the example controller 104 includes a media management layer 236 that performs wear leveling of the memory 110. In embodiments where the storage system 102 includes flash memory, the media management layer 236 can be integrated as part of the flash management that handles flash error and interfaces with the host 106. In particular, the media management layer 236 can include an algorithm (e.g., firmware in the memory device), that translates a write command received from the host 106 into a write to the memory 110. Accordingly, modules and components within an example controller 104 have been described.

Figure 2B:
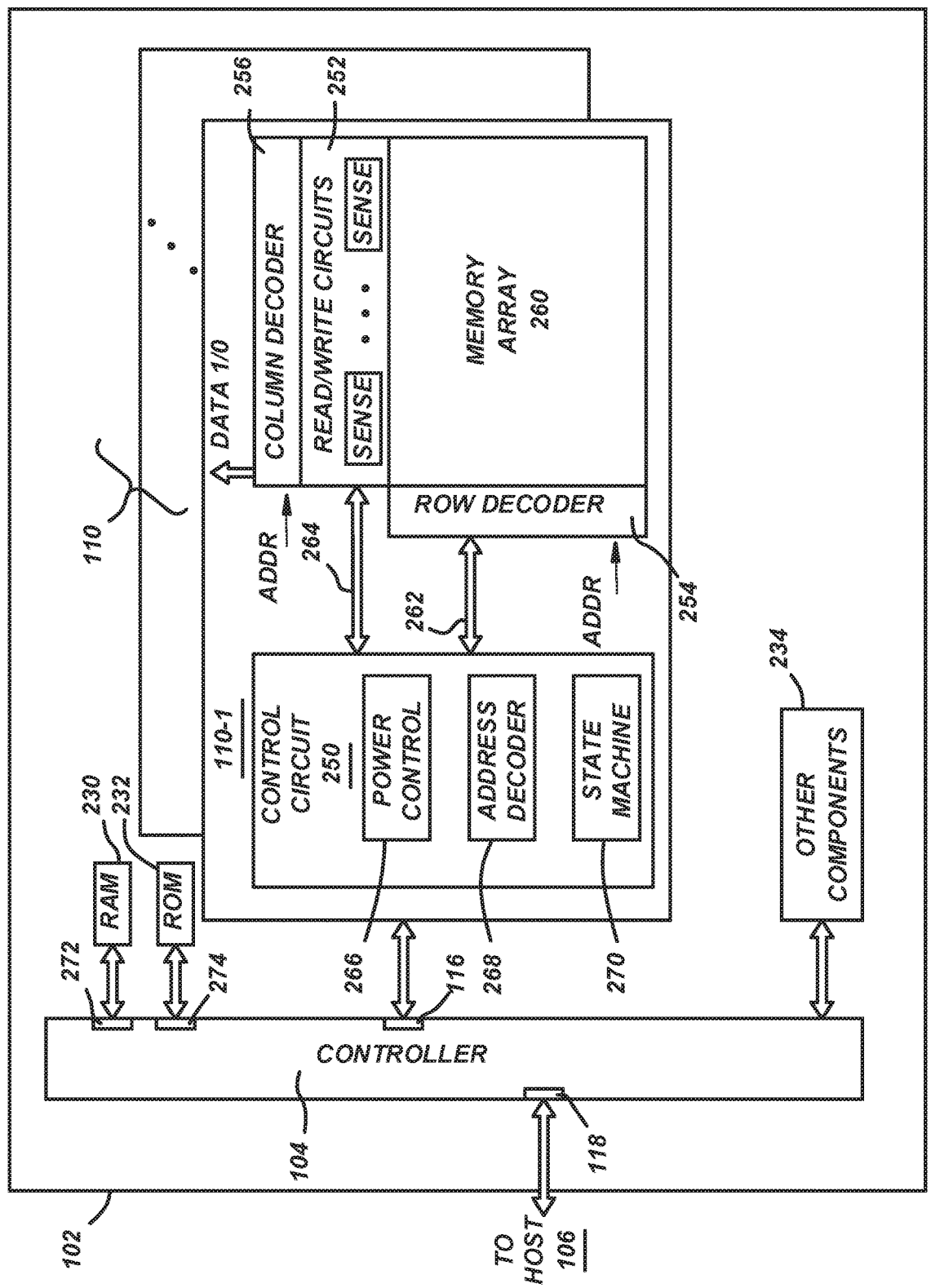
FIG. 2B illustrates a block diagram of example components of a non-volatile memory storage system, in accordance with some embodiments.

FIG. 2B shows in block diagram form, various features and an example layout of the memory 110 within the storage system 102. In order to orient the reader, previously described controller 104, RAM 230, and the ROM 232, are included in FIG. 2B. Although the discussion in FIG. 2B centers on the memory die 110-1, each of the features discussed in relation to the memory die 110-1 equally applies to all the memory die within the memory 110.

In various embodiments, the example memory die 110-1 includes control circuit 250, read/write circuits 252, a row decoder 254, a column decoder 256, and a memory array 260. The example control circuit 250 includes a power control circuit 266, an address decoder 268, and a state machine 270. In some embodiments, the power control circuit 266, the address decoder 268, and the state machine 270 are collectively referred to herein as "managing circuits." The control circuit 250 and its various managing circuits, are communicatively coupled by various interfaces (e.g., interfaces 262 and 264) to the row decoder 254 and the column decoder 256. In various embodiments, the control circuit 250 performs various operations on the memory array 260 that include reading or writing to the memory cells by way of the row decoder 254 and the column decoder 256. In some embodiments, the read/write circuits 252 are configured to read and program pages of memory within the memory die 110-1 in parallel.

The power control circuit 266 controls the power and voltage supplied to the word lines and bit lines during operation of the memory array 260. The address decoder 268 provides an address interface that translates addresses between addresses provided by the host 106 and addresses used by the row decoder 254 and the column decoder 256 and vice versa. The state machine 270 provides chip-level control of memory operations.

The architecture of the memory die 110-1 is not meant to be limiting and any known architecture that can perform the functions of accessing the memory array 260 can be used without departing from the scope of this disclosure. For example, in various embodiments, access to the memory array 260 by various peripheral circuits can be implemented in a symmetric fashion on opposite sides of the memory array 260 which reduces the densities of access lines and circuitry on each side of the memory array 260.

Figure 3:
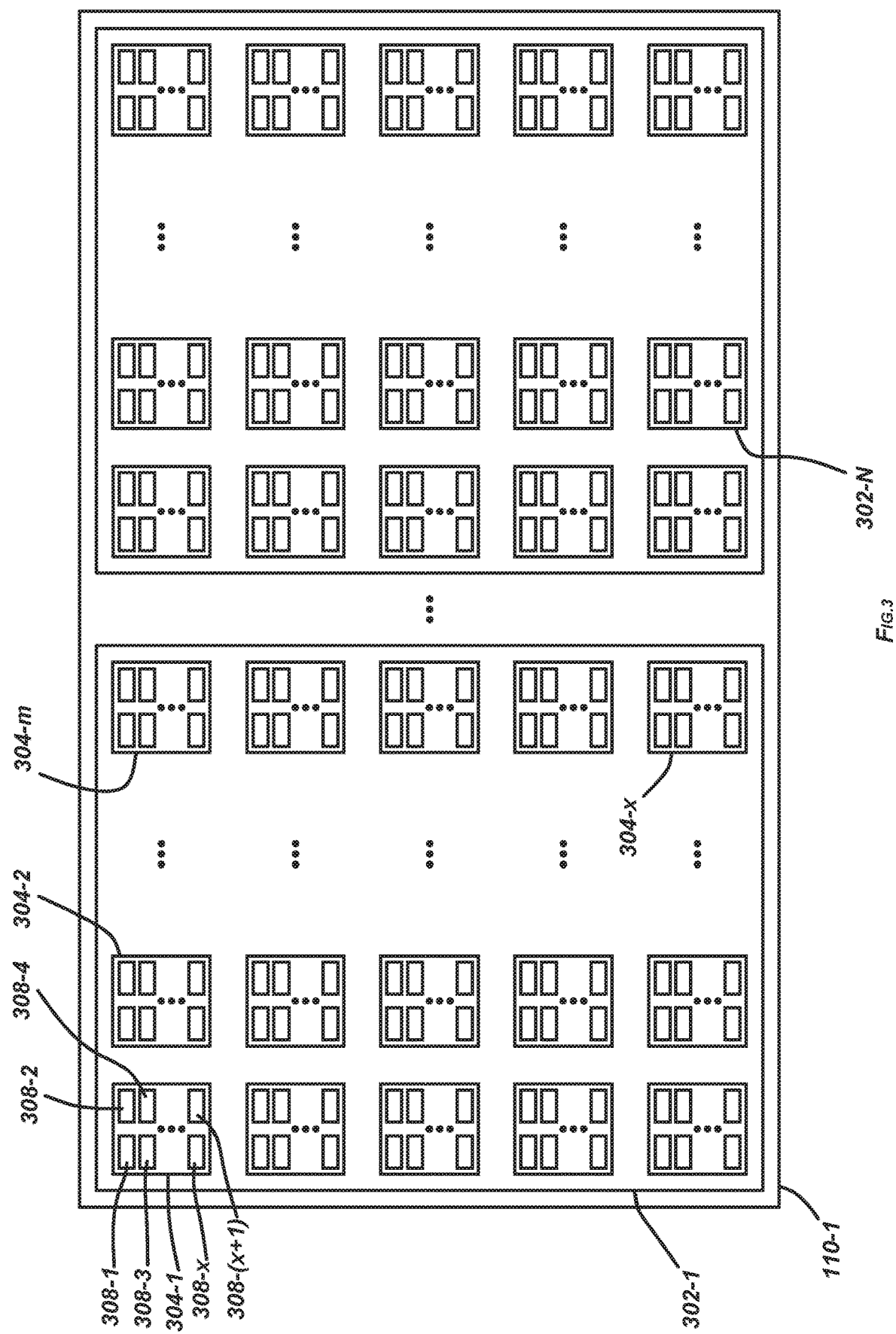
FIG. 3 illustrates a block diagram of a memory die, in accordance with some embodiments.

FIG. 3 illustrates an example memory die 110-1 in block diagram form, in accordance with some embodiments. Specifically, FIG. 3 illustrates one example logical grouping of the memory cells within the memory die 110-1. The example memory die 110-1 can be grouped physically or logically into one or more memory planes 302. Taking memory plane 302-1 as an example, each memory plane can further logically or physically be further grouped into memory blocks 304, where each of the memory blocks is further divided into memory pages 308, where a page is defined as the smallest unit that can be programmed or written to. A memory block defines the smallest unit that can be erased. In some examples, the memory pages 308 can be correlated a word line and respective string of the word line (e.g., in 3-D NAND). In other examples, the memory pages 308 can be correlated to an underlying wordline (e.g., in planar NAND).

Under a traditional XOR scheme, adjacent memory pages 308 are recoverable using an XOR parity scheme. For example, if memory page 308-2 contains data that cannot be read out, controller 104 can perform a de-XOR operation on page 308-1 and previously calculated parity information, to recover the data of page 308-2. However, if a short extends through pages 308-1, 308-2, 308-3, and 308-4, the traditional XOR scheme would not be able to recover data from memory page 308-2. Under the traditional XOR scheme, controller 104 would mark memory blocks 304-1 for garbage collection. During the garbage collection operation, the controller 104 will move the data stored in memory block 304-1 to a different memory block (e.g., memory block 304-x) and then retire memory block 304-1, such that it is no longer used by the system.

The modified XOR scheme, however, enables controller 104 to recover data from non-adjacent memory pages also. Thus, the methods described herein help extend the lifetime of memory blocks 304-1, by allowing a controller 104 to continue using memory blocks that would otherwise be retired. That is, by implementing the techniques described herein, for the given example above where a short extends through memory pages 308-1, 308-2, 308-3, and 308-4, the controller 104 would be able to continue utilizing the memory block 304-1.

Figure 4A:
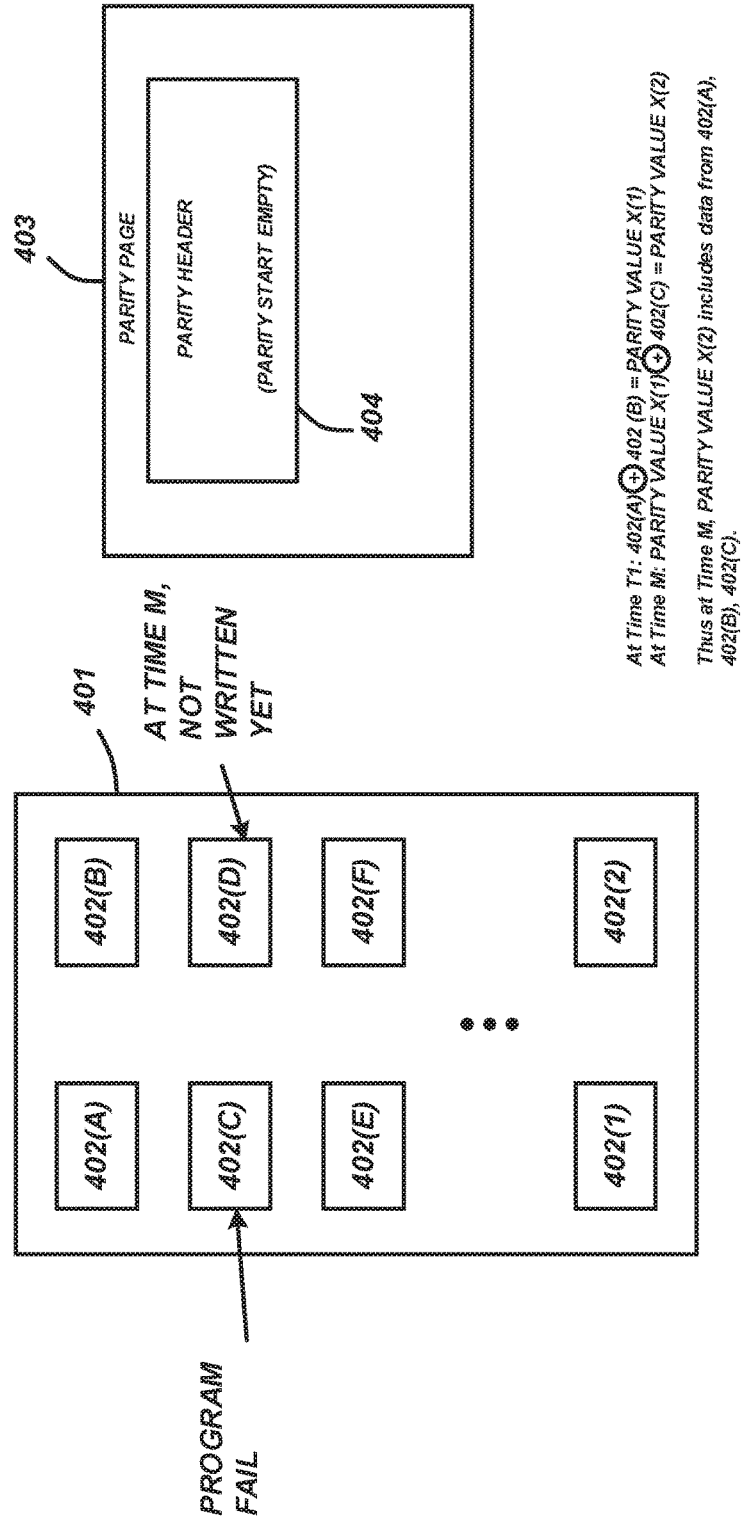
FIG. 4A illustrates a conceptual and method diagram in which a modified XOR scheme is performed on a memory block, in accordance with some embodiments.
Figure 4B:
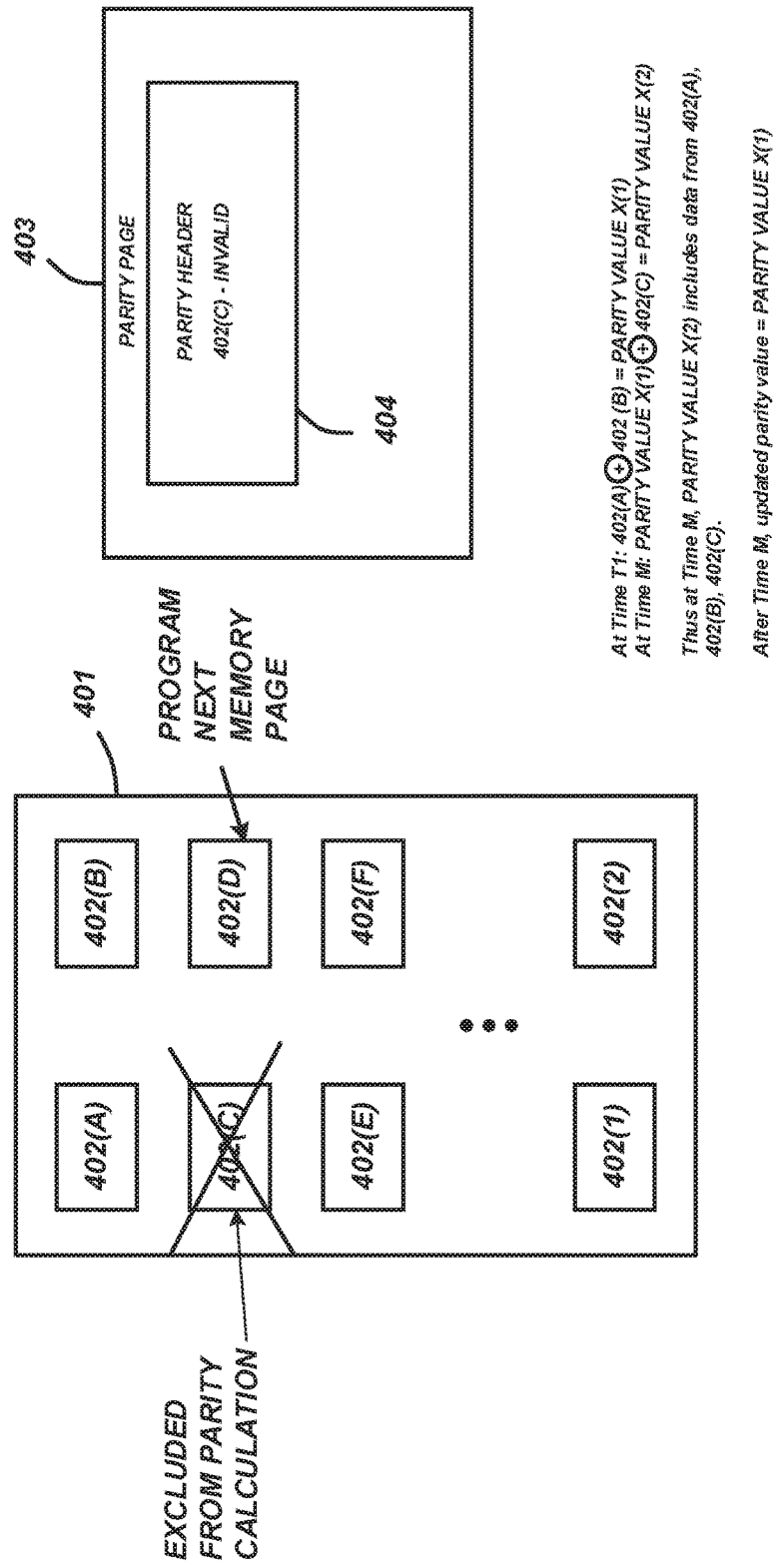
FIG. 4B illustrates a conceptual and method diagram in which a modified XOR scheme is performed on a memory block, in accordance with some embodiments.

FIGS. 4A-4B illustrate conceptual and method diagrams in which a modified XOR scheme is performed on a memory block, in accordance with some embodiments. The modified XOR scheme is performed in response to receiving a failure indicator during a programming operation including, for example a post-write read and a program fail. As used herein, a post-write read is any operation that reads data from a memory block soon after data is written to the block. The post-write read is performed to verify that the data read out from the memory block matches the data written to the memory block. In some embodiments, a post-write read includes an enhance post-write read (EPWR) defined as a read operation performed after a write operation, where the read operation uses error correction code to reconstruct the originally written data even when errors exist in a subset of the data read out. A program failure is any failure that occurs during a write operation.

In FIG. 4A, a failure indicator is received by controller 104 (shown in FIG. 1) regarding memory block 401. In various embodiments, the failure indicator contains information about the memory block and the page of memory within the memory block that is failing. In FIG. 4A, for example, controller 104 receives a failure indicator identifying memory block 401 and memory page 402(C). Accordingly, controller 104 performs the modified XOR scheme on memory block 401.

As used herein, the modified XOR scheme can include one or more modified XOR operations including for example, a modified de-XOR operation (referred to interchangeably as a de-XOR operation) performed on the memory block and a parity calculation associated with the memory block. When performing the modified XOR scheme, data in parity header 404 indicates memory pages that are excluded from the modified XOR scheme. That is, the modified XOR scheme includes de-XOR operations and parity calculations that take into account excluded memory pages. The de-XOR operations and parity calculations define modified XOR operations that are part of the modified XOR scheme. A parity calculation, performed in accordance with the embodiments described herein, generates an updated parity value. Of note, references to a parity value may be used interchangeably with an updated parity value.

The example illustrated in FIG. 4A describes an example scenario in which the controller 104 encounters an error for the first time during a programming operation. Accordingly, the parity header 404 is initially empty. As described herein, subsequent to encountering the first failure, and as the controller 104 continues to program the memory block 401, the parity header 404 tracks the memory pages on which the controller 104 has encountered an error during programming. In various embodiments, the parity header 404 is representative of any scheme or method of storing and tracking memory pages that are excluded from a modified XOR scheme.

The data stored in the parity header 404 can be used in at least two different scenarios. One scenario includes when the controller 104 encounters a program failure (e.g., post-write read or program failure). Another scenario includes when the controller 104 reads the data at some future time and encounters a page fail (e.g., read failure).

Parity header 404 is stored as a bit map in the header of an XOR parity page 403. The parity header 404 and parity page 403 can be stored in various locations in memory 110—e.g., as a page of memory in the memory block 401 or as a page in special block 304-x (described in FIG. 3), or in the RAM 230 (described in FIG. 2A). Parity header 404 tracks a status of memory pages (e.g., valid or invalid). In one example, a single bit status indicates if a page is valid or not. For example, a "1" stored in the parity header 404 is attributed to an invalid page, while a "0" stored in the parity header 404 is attributed to a valid page.

The information in parity header 404 is updated when controller 104 identifies a faulty page in memory block 401. As the information in parity header 404 can change, controller 104 checks a status bit of a memory page prior to performing the modified de-XOR operation to it. If the page is marked invalid (e.g., a "1" stored in the parity header 404), then the modified de-XOR operation excludes any identified faulty page from the modified de-XOR operation.

In operation, controller 104 programs data into memory block 401 using an example write operation. For sake of example in FIG. 4A, during the example write operation, controller 104 encounters a failure indicator associated with the memory page 402(C). In various examples, respective memory pages can become faulty at different times for different reasons.

During the example write operation controller 104 calculates an updated parity value after writing data to a page. For example, upon choosing to write data to memory block 401, controller 104 writes data to the first available page, e.g., page 402(A) and calculates an updated parity value that includes the data in page 402(A). In some examples, controller 104 does not calculate an updated parity value until at least two pages have been written to memory block 401.

Controller 104 proceeds next to program memory page 402(B). After programming memory page 402(B), controller 104 performs a modified XOR operation where controller 104 calculates an XOR result of pages 402(A) and 402(B) to generate an updated parity value X(1). For example:

$$402(A) \oplus 402(B) = \text{PARITY VALUE } X(1). \quad (1)$$

Subsequent to programming memory page 402(B) and generating an updated parity value X(1), controller 104 proceeds to program memory page 402(C). Similar to before, controller 104 calculates an XOR result of pages 402(A), 402(B), and 402(C) to generate an updated parity value X(2). In one example, controller 104 calculates the updated parity value X(2) by calculating an XOR result of updated parity value X(1) and memory page 402(C). For example:

$$\text{PARITY VALUE } X(1) \oplus 402(C) = \text{PARITY VALUE } X(2). \quad (2)$$

Controller 104 calculates the updated parity value X(2) at a time M, where time M occurs after memory page 402(C) has been programmed, but before page 402(D) is programmed.

Around time M, and prior to programming page 402(D), the controller 104 encounters a failure indicator associated with memory page 402(C). Of note, around time M, an updated parity value does not include page 402(D). In one example, the failure indicator is a program failure.

Through the failure indicator, controller 104 receives notification that data written to memory page 402(C) is bad and proceeds to recover the data by performing one or more modified de-XOR operations. As used herein, a de-XOR operation includes calculating a data of a page, given an updated parity value that includes the data of the page and other pages.

Before starting the de-XOR operation, the controller 104 checks the parity header 404. Referring to FIG. 4A, the failure encountered with respect to page 402(C) is the first during programming of the memory block 401. Accordingly, the parity header 404 indicates all pages written so far are valid pages. In a generic example if previously known pages did exist and were beyond the last known written page, the faulty pages would be ignored till such time and a page is written beyond the known faulty page.

In FIG. 4B, the modified de-XOR operation is used to recover the data that should have been programmed into the memory page 402(C). In one example of performing one or more modified de-XOR operations to recover data, controller 104 calculates a de-XOR result of an updated parity value X(2) and memory page 402(A). For example, the de-XOR operation can be performed by calculating:

$$\text{PARITY VALUE } X(2) \oplus 402(A) = \text{PARITY VALUE } X(3). \quad (3)$$

Updated parity Value X(2) is kept intact for later operation to continue writing to the block 401. Updated parity value X(3) includes data for memory pages 402(B) and 402(C). Controller 104 continues performing de-XOR operations until it recovers data for the faulty memory page 402(C). For example, controller 104 next calculates a de-XOR result of updated parity value X(3) and memory page 402(B). For example, the de-XOR operation can be performed by calculating:

$$\text{PARITY VALUE } X(3) \oplus 402(B) = \text{PARITY VALUE } X(4) \qquad (4)$$

In various embodiments, the updated parity value X(4) is the same as the data in memory page 402(C). Accordingly, updated parity value X(4) can be stored in a different location in memory (e.g., another location in memory block 401, another location in memory 110, etc.).

To continue programming to the memory block 401—e.g., programming to the memory page 402(D)—controller 104 recalculates parity to generate an updated parity value. Recall, prior to recovering the data, the updated parity value was updated parity value X(2), a parity that include the faulty memory page 402(C). The controller 104 recalculates the parity by removing the data associated with the faulty memory page 402(C) from the updated parity value X(2). The data associated with memory page 402(C) is the same as the updated parity value X(4). The result of performing a de-XOR operation between the updated parity value X(4) and the updated parity value X(2) is the updated parity value X(1).

$$\text{PARITY VALUE } X4 \oplus \text{PARITY VALUE } X2 = \text{PARITY VALUE } X(1) \qquad (5)$$

As described previously in this example, the updated parity value X(1) is the result of the parity between memory pages 402(A) and 402(B) (e.g., equation 1 above).

Still referring to FIG. 4B, when the controller 104 begins the one or more modified de-XOR operations, controller 104 can begin with the first valid memory page in memory block 401 that is not excluded by the modified XOR scheme (e.g., as captured by the parity header 404). In other embodiments, controller 104 begins with any known good memory page that precedes the faulty memory page to initiate the one or more de-XOR operations. For example, upon encountering the failure indicator associated with memory page 402(C), controller 104 begins the modified de-XOR operation between updated parity value X(3) and memory page 402(B).

In FIG. 4B, controller 104 excludes the faulty memory page 402(C) from current and future modified XOR operations. As reflected by the data in the parity header 404, the memory page 402(C) is identified as a faulty page. As previously described, in one example, the memory page 402(C) is assigned an invalid status.

In FIG. 4B, the controller 104 continues to program to the memory block 401—e.g., performs a write operation on the memory page 402(D). Similar to XOR operations described above (e.g., in equations 1 and 2), the controller 104 continues to calculate an updated parity value with each programmed page. To continue the example, after programming the memory page 402(D), the controller 104 calculates an XOR result of updated parity value X(1) and the memory page 402(D). For example:

$$\text{PARITY VALUE } X(1) \oplus 402(D) = \text{PARITY VALUE } X(5) \qquad (6)$$

In various embodiments, the controller 104 programs the remaining memory pages without issue, and thus the descriptions in FIGS. 4A and 4B illustrate a manner in which a modified XOR scheme can be implemented that enables the controller 104 to continue programming to a memory block 401 despite encountering a program fail associated with one of the memory pages of the memory block 401.

Figure 5A:
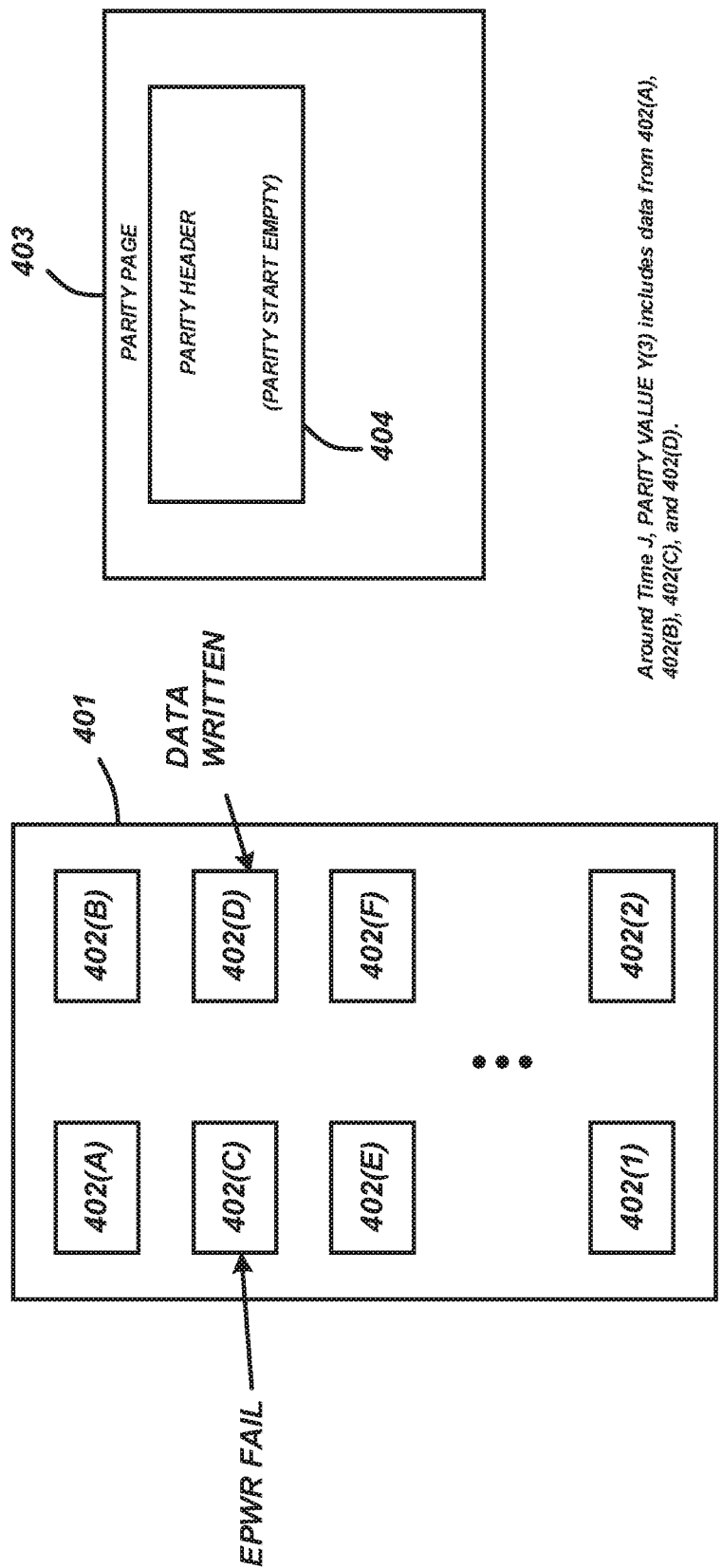
FIG. 5A illustrates a conceptual and method diagram in which a modified XOR scheme is performed on a memory block, in accordance with some embodiments.

The example described in FIGS. 4A and 4B included a program fail error in which a subsequent page beyond the failing memory page had not yet been programmed. In FIG. 5A, an example is described in which a program fail is encountered in which the subsequent memory page is also programmed.

In FIG. 5A, an embodiment is described in which the controller 104 receives, at time J, a failure indicator associated with a post write read (e.g., EPWR) associated with the memory page 402(C). Around the time J, data has already been written to the memory page 402(D), additionally an updated parity value includes data from memory pages 402(A), 402(B), 402(C), and 402(D). For example:

$$402(A) \oplus 402(B) = \text{PARITY VALUE } Y(1). \qquad (7)$$

$$\text{PARITY VALUE } Y(1) \oplus 402(C) = \text{PARITY VALUE } Y(2). \qquad (8)$$

$$\text{PARITY VALUE } Y(2) \oplus 402(D) = \text{PARITY VALUE } Y(3). \qquad (9)$$

At some time after programming the memory page 402(D), the controller 104 receives the failure indicator associated with the memory page 402(C). To recover the data associated with 402(C), the steps similar to those described in FIG. 4A are performed. Furthermore, before recovering the data associated with 402(C), additional de-XOR steps are performed at around time J, as the updated parity value includes data associated with the memory page 402(D).

To recover the data associated with memory page 402(C), the controller 104 performs the de-XOR operations $$\text{PARITY VALUE } Y(3) \oplus 402(A) = \text{PARITY VALUE } Y(4). \qquad (10)$$

$$\text{PARITY VALUE } Y(4) \oplus 402(B) = \text{PARITY VALUE } Y(5). \qquad (11)$$

$$\text{PARITY VALUE } Y(5) \oplus 402(D) = \text{PARITY VALUE } Y(6). \qquad (12)$$

In various embodiments, the updated parity value Y(6) is the same as the data in memory page 402(C). Accordingly, FIG. 5A illustrates an example method for recovering data associated with the faulty memory page 402(C), when an updated parity value already includes the subsequent memory page 402(D) and after the memory page 402(D) has been written to.

Thus the example described in FIG. 5A includes a post write read failure in which a memory page subsequent to the failing memory page has already been programmed. Although the examples in FIGS. 4A-4B and 5A illustrate applying the described methods to a first failing memory page, the methods can be applied in any combination to handle multiple failing pages within a memory block.

By way of example, the example in FIGS. 4A-4B is continued in FIG. 6A where additional program fails (such as EPWR) are encountered during the programming of the memory block 401. In particular, in the example in FIG. 6A, the controller 104 has already encountered a program fail associated with the memory page 402(C) (as described in FIGS. 4A-B).

In FIG. 6A, around time N, the controller 104 encounters a failure indicator associated with the memory page 402(E). Of note, around time N, an updated parity value includes page 402(E). In one example, the failure indicator is a post-write read failure (similar to the example described in FIG. 5A). Accordingly, in this example the memory page 402(F) may have been written to.

Continuing the example from FIG. 4B, the controller 104 writes to memory page 402(E) and calculates an XOR result of pages 402(E) and updated parity value X(5). For example:

$$\text{PARITY VALUE } X(1) \oplus 402(D) = \text{PARITY VALUE } X(5). \quad (13)$$

$$\text{PARITY VALUE } X(5) \oplus 402(E) = \text{PARITY VALUE } X(6). \quad (14)$$

Furthermore, the controller 104 continues to program memory page 402(F) and calculates an updated parity value X(7). For example:

$$\text{PARITY VALUE } X(6) \oplus 402(F) = \text{PARITY VALUE } X(7). \quad (15)$$

Around time N, after programming page 402(F) and including page 402(F) in an updated parity value, controller 104 encounters a failure indicator associated with memory page 402(E). In one example, the failure indicator is a post-write read failure, where 402 (F) could have been written. Through the failure indicator, controller 104 receives notification that data written to memory page 402(E) is bad and proceeds to recover the data by performing one or more modified de-XOR operations.

Before starting modified de-XOR operations, the parity header 404 is checked and the controller 104 determines the memory page 402(C) is faulty or invalid. In one example of performing one or more modified de-XOR operations, controller 104 calculates a de-XOR result starting with the updated parity value X(7) and memory page 402(A). In this example, the de-XOR operations performed to recover the data associated with page 402(E) will exclude page 402(C). For example, the de-XOR operation can be performed by calculating:

$$\text{PARITY VALUE } X(7) \oplus 402(A) = \text{PARITY VALUE } X(8) \quad (16)$$

$$\text{PARITY VALUE } X(8) \oplus 402(B) = \text{PARITY VALUE } X(9) \quad (17)$$

$$\text{PARITY VALUE } X(9) \oplus 402(D) = \text{PARITY VALUE } X(10) \quad (18)$$

$$\text{PARITY VALUE } X(10) \oplus 402(F) = \text{PARITY VALUE } X(11) \quad (19)$$

In various embodiments, the updated parity value X (11) is the same as the data in memory page 402(E). Accordingly, updated parity value X (11) can be stored in a different location in memory (e.g., another location in memory block 401, or in another location in memory 110).

Figure 6B:
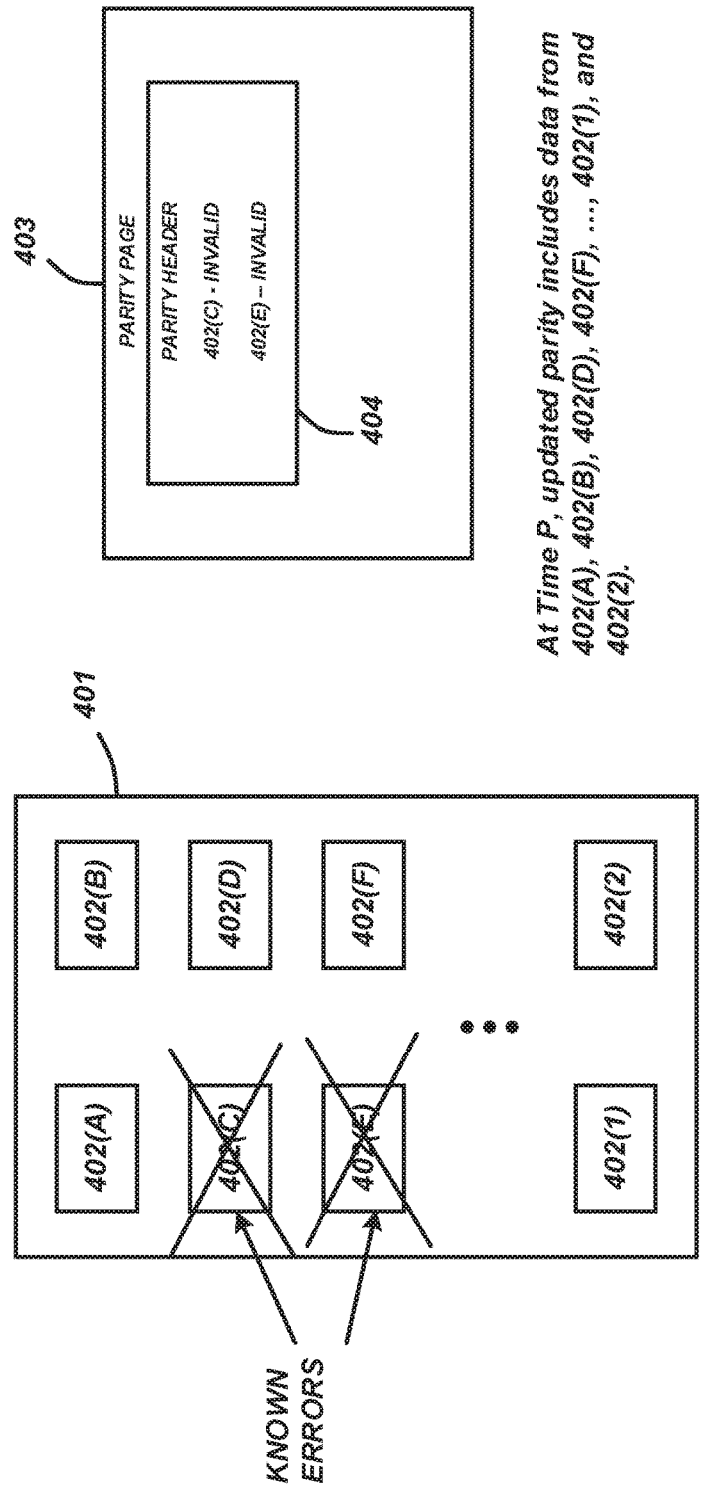
FIG. 6B illustrates a conceptual and method diagram in which a modified XOR scheme is performed on a memory block, in accordance with some embodiments.

With reference to FIG. 6B, after programming of memory block 401 is complete (e.g., at time P), an updated parity value is calculated that includes memory pages 402(A), 402(B), 402(D), 402(F), . . . , 402(1), and 402(2). That is, the updated parity value at time P excludes memory pages 402(C) and 402 (E).

In the example discussed in FIGS. 4A-4B, 5A, 6A-6B, the first page (memory page 402(A)) did not encounter an error. In one example, when controller 104 encounters a failure indicator associated with the first page such as memory page 402(A), the controller 104 can access the updated parity value after programming memory page 402(A) to recover the data directly without needing to perform modified de-XOR operations.

In additional embodiments, the controller 104 can retire a memory block after a threshold amount of memory pages have been assigned an invalid status in the memory block. For example, after parity header 404 includes a number of memory pages greater than the threshold amount, controller 104 retires memory block 401. For example, a threshold amount may be defined as a percentage of the number of pages in memory block 401, and the threshold amount may be 30%. In some embodiments, the threshold amount ranges between 20-40%. Accordingly, when 30% of the memory pages in a memory block are marked as faulty, the memory block is retired.

Accordingly, a modified de-XOR operation can be used to recover data from a faulty memory page, while a memory block is being programmed. Without access to the methods described herein, upon encountering an error in a page, controller 104 would stop programming and mark the entire memory block as faulty. The modified XOR scheme helps increase the lifetime of a memory block 401 by enabling controller 104 to recover data from a faulty memory page and selectively including working memory pages in an updated parity value. As the updated parity value is not limited to XOR operations between adjacent memory pages, the modified XOR scheme can be used to recover data between non-adjacent memory pages.

Figure 7:
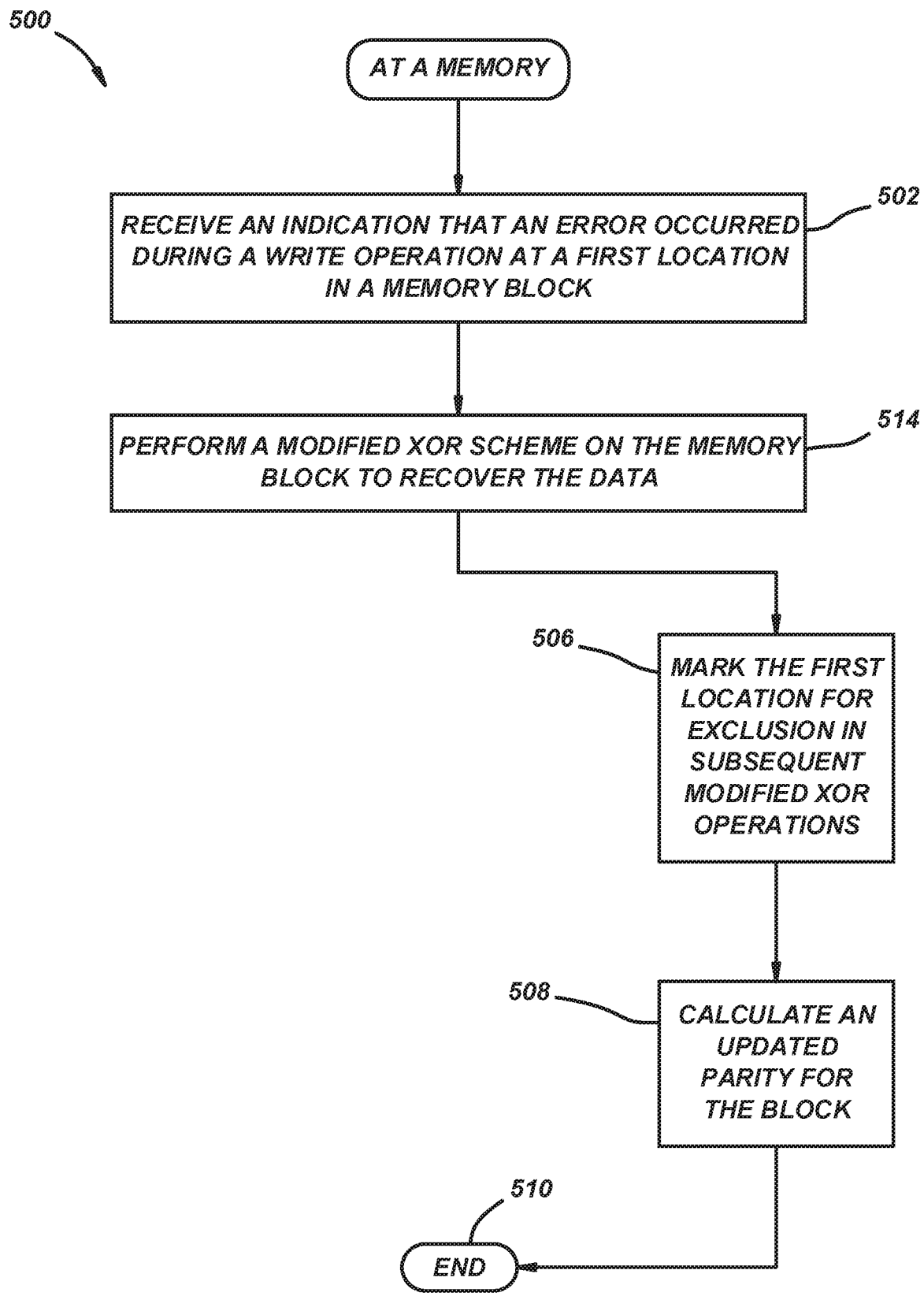
FIG. 7 illustrates a method diagram, in accordance with some embodiments.

FIG. 7 illustrates a method diagram, in accordance with some embodiments. In particular, the method 500 is performed at a memory and illustrates steps performed by a controller implementing a modified XOR scheme. In particular, a controller receives an indication that an error occurred during a write operation at a first location in a memory block (block 502); the controller performs a modified XOR scheme on the memory block to recover data (block 504). Next the controller marks the first location for exclusion in subsequent modified XOR operations (block 506). As described in FIGS. 4A-4B, marking the first location for exclusion can include updating a parity header, and more specifically a status indicator associated with the first location. Furthermore, an example first location is memory page 402(D). Next the controller calculates an updated parity value for the block (block 508). The updated parity value is a parity value that includes pages in the memory block that are not excluded from the modified XOR scheme. Thereafter the method ends (block 510).

Figure 8:
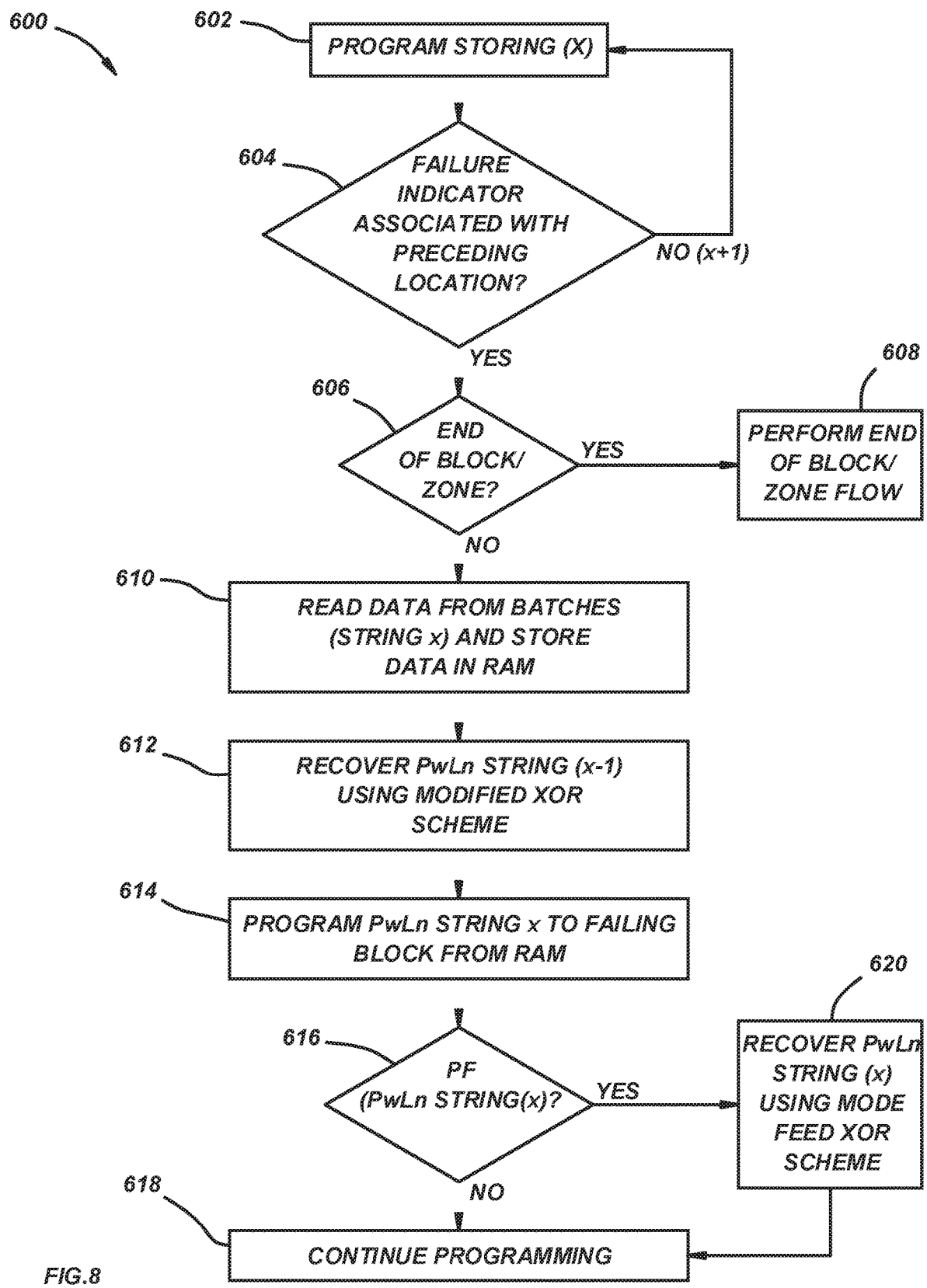
FIG. 8 illustrates a method diagram, in accordance with some embodiments.

The modified XOR scheme can be integrated into several methods of programming a memory block. One example method 600 is described in FIG. 8. The method begins where a controller programs a string (x) within a memory (block 602). As used herein, a string refers to a component within a 3-D memory, wherein a word line in the 3-D memory includes a certain number of strings. In one example, a word line includes four strings. In this example, a page of memory is defined by a specific word line and a string of the word line.

At or around the time the controller programs string (x), a memory controller (e.g., controller 104) checks to see if a failure indicator has occurred associated with a preceding location, string (x−1) (decision block 604). If no, the memory controller proceeds with programming the next string (x+1). If yes, the controller checks to see if the location (e.g., of the page) is at the end of a block or zone (decision block 606). If yes, the memory controller performs an end of block/zone flow described further in FIG. 9 (block 608). If no, the memory controller 104 reads data from latches (e.g., data for string x) into RAM or some other temporary storage location (block 610).

The memory controller proceeds to recover the data from string (x−1) using the modified XOR scheme (block 612), then programs data for string (x) into the failing memory block from RAM (block 614). The controller determines whether a failure indicator has occurred associated with the location string (x) (decision block 616). For example, the controller determines whether program fail has occurred. If no, the controller continues programming (block 618). In yes, the controller recovers the data from the location string(x) using the modified XOR scheme (block 620).

Figure 9:
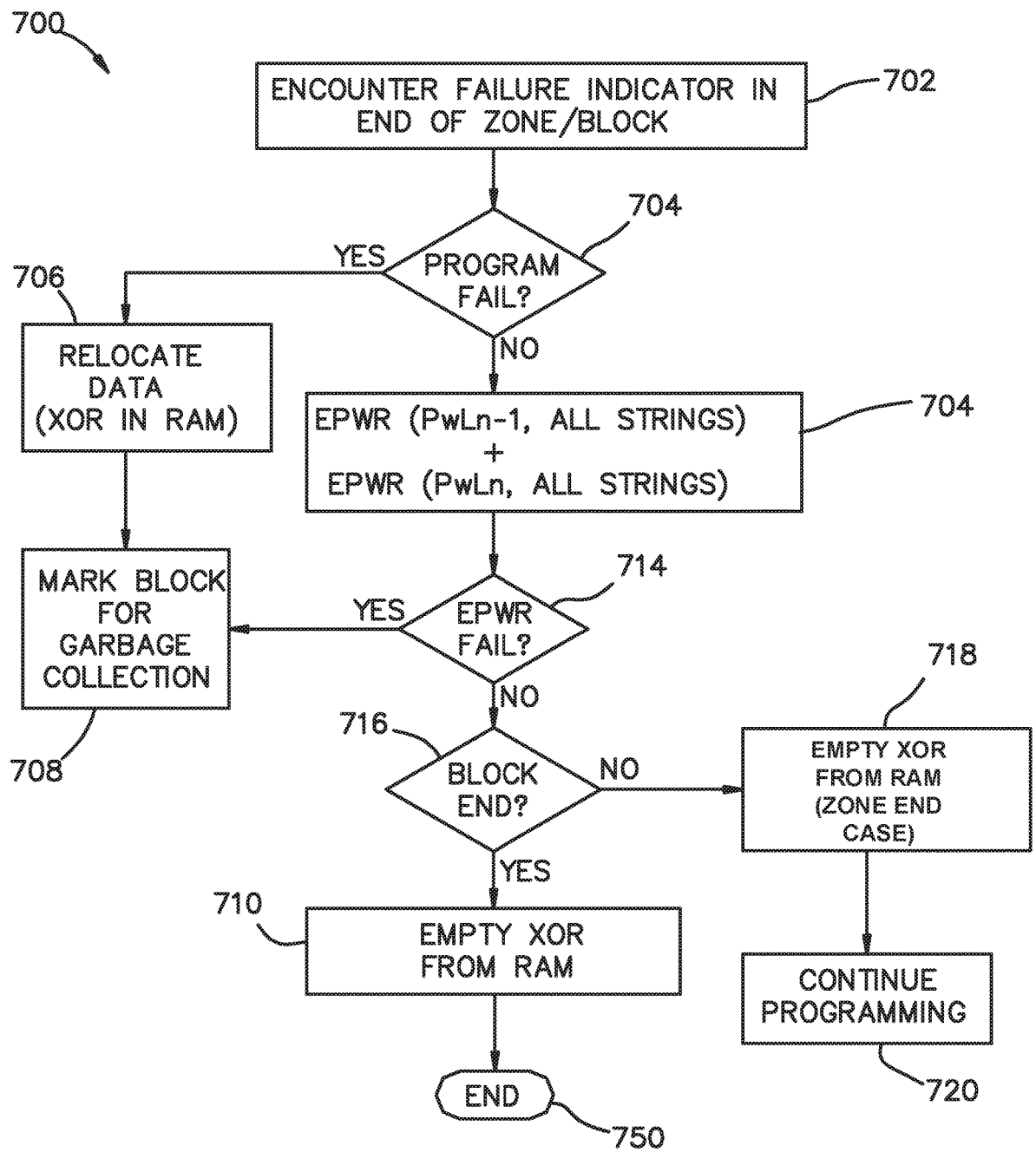
FIG. 9 illustrates a method diagram, in accordance with some embodiments.

FIG. 9 illustrates an example variation to the method described in FIG. 6. The controller performs method 700 when a faulty page (e.g., respective word line and string, or a respective word line) is located at the end of a memory block or zone. The controller encounters a failure indicator associated with a location at the end of a memory block or zone (block 702), in response the controller determines if the failure indicator is associated with a program fail error (decision block 704). If yes, the controller relocates the data (XOR in RAM) (block 706), marks the memory block for garbage collection (block 708); empties XOR from RAM (block 710); and thereafter the method ends (block 750).

Returning back to decision block 704, if the failure indicator is not a program fail error, the controller performs an enhanced post-write read (EPWR) operation on both the current word line (PWLn) all strings in PWLn, and the preceding word line (PWLn−1) and all strings in PWLn−1 (block 712). The controller determines whether the enhanced post-write read operations resulted in any failures (decision block 714). If yes, the controller marks the memory block for garbage collection (block 708); empties XOR from RAM (block 710); and thereafter the method ends (block 750). If no, the controller checks to see if it is at the end of a block (decision block 716).

If the controller determines yes to decision block 716, the controller empties XOR from RAM (block 710) and thereafter the method ends (block 750). If the controller determines no to decision block 716, the controller determines it is at the end of a zone and empties XOR from RAM (zone end case) (block 718) and continues programming (block 720). In some embodiments, the steps of continuing to program include applying the method 600 described in FIG. 6.

The above discussion is meant to be illustrative of the principles and various embodiments described herein. Numerous variations and modifications will become apparent to those skilled in the art once the above disclosure is fully appreciated. For example, although a controller 104 has been described as performing the methods described above, any processor executing software within a host system can perform the methods described above without departing from the scope of this disclosure. In particular, the methods and techniques described herein as performed in the controller, may also be performed in a host. Furthermore, the methods and concepts disclosed herein may be applied to other types of persistent memories other than flash. It is intended that the following claims be interpreted to embrace all such variations and modifications.

What is claimed is:

1. A method of extending a lifetime of a memory block, comprising:
    receiving an indication that an error occurred during a write operation at a first location in a memory block, the first location associated with a faulty page of the memory block;
    performing a modified exclusive OR (XOR) scheme on the memory block by:
        performing a de-XOR operation that generates recovery data of the faulty page;
        storing the recovery data in a location different from the faulty page of memory;
        marking the faulty page for exclusion in future de-XOR operations; and
        performing a parity calculation that generates an updated parity value that includes all pages of the memory block that have been programmed except for the faulty page;
    receiving a second indication that an additional error occurred during a different write operation to the memory block, wherein the additional error is associated with a second faulty page; and
    performing the modified XOR scheme an additional time on the memory block by:
        performing an additional de-XOR operation starting with a first valid page of the memory block, wherein the additional de-XOR operation generates a second recovery data;
        determining the second faulty page is located at the end of the memory block, in response to determining the second faulty page is located at the end of the memory block,
        moving the second recovery data from the memory block; and
        marking the memory block for garbage collection.

2. The method claim 1, wherein marking the faulty page for exclusion further comprises, updating status data in a bit map, wherein the status data is associated with a status of the faulty page, wherein the bit map is located in a header of a parity page.

3. The method of claim 2, wherein performing the de-XOR operation, further comprises starting with a first valid page of the memory block.

4. The method of claim 1, wherein performing the modified XOR scheme an additional time further comprises, prior to performing the additional de-XOR operation,
    reading a header of a parity page; and
    determining, based on information in the header that the faulty page is excluded from the modified XOR scheme.

5. The method of claim 1, wherein a result of excluding the faulty page is a subsequent de-XOR operation is performed using two non-adjacent pages.

6. The method of claim 1, further comprising:
    tracking a number of pages excluded from the modified XOR scheme, wherein the pages are marked invalid; and
    retiring the memory block in response to determining the number of pages is above a threshold amount.

7. A memory controller, comprising:
    a first terminal configured to couple to a memory array, the memory controller configured to:
        receive an indication that an error occurred during a write operation at a first location in a memory block, the first location associated with a faulty page of the memory block;
        perform a modified exclusive OR (XOR) scheme at a first time on the memory block, wherein the memory controller is further configured to:
            perform a de-XOR operation starting with a page of the memory block that is valid, wherein the de-XOR operation generates recovery data of the faulty page;
            store the recovery data in a location different from the faulty page;
            mark the faulty page for exclusion in future de-XOR operations; and perform a parity calculation that generates an updated parity value that includes all pages of the memory block that have been programmed except for the faulty page;

receive a second indication that an additional error occurred during a different write operation to the memory block, wherein the additional error is associated with a second faulty page; and perform the modified XOR scheme at a second time on the memory block, wherein the memory controller is further configured to:

perform an additional de-XOR operation that starts with a page of the memory block, wherein the additional de-OXR operation generates second recovery data;

determine the second faulty page of memory is located at the end of the memory block; in response to determining the second faulty page is located at the end of the memory block, move the second recovery data from the memory block; and mark the memory block for garbage collection.

8. The memory controller of claim 7, wherein marking the faulty page for exclusion further comprises, updating status data in a bit map, wherein the status data is associated with a status of the faulty page, wherein the bit map is located in a header of a parity page.

9. The memory controller claim 7, wherein when the memory controller performs the modified XOR scheme at a second time, the memory controller is further configured to, prior to performing the additional de-XOR operation, read a header of a parity page; and determine, based on information in the header that the faulty page is excluded from the modified XOR scheme.

10. The memory controller of claim 7, wherein a result of excluding the faulty page is a subsequent de-XOR operation is performed using two non-adjacent pages.

11. The memory controller of claim 7, further configured to:

track a number of pages excluded from the modified XOR scheme, wherein the pages are marked invalid; and retire the memory block in response to determining the number of pages is above a threshold amount.

12. The memory controller of claim 11, wherein the memory controller is configured to retire the memory block by marking the memory block for garbage collection.

* * * * *